(12) United States Patent
Chen et al.

(10) Patent No.: US 12,309,253 B2
(45) Date of Patent: May 20, 2025

(54) METHOD OF MONITORING CLOCK SIGNAL OF SERVER

(71) Applicant: MITAC COMPUTING TECHNOLOGY CORPORATION, Taoyuan (TW)

(72) Inventors: Yu-Yuan Chen, Taoyuan (TW); Po-Wei Chang, Taoyuan (TW); Chi-Hua Li, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 13 days.

(21) Appl. No.: 18/219,870

(22) Filed: Jul. 10, 2023

(65) Prior Publication Data

US 2024/0146501 A1 May 2, 2024

(30) Foreign Application Priority Data

Nov. 1, 2022 (TW) .................................. 111141599

(51) Int. Cl.
*H04L 7/033* (2006.01)
(52) U.S. Cl.
CPC .................................. *H04L 7/0331* (2013.01)
(58) Field of Classification Search
CPC .................................................... H04L 7/0331

USPC .......................................................... 375/376
See application file for complete search history.

(56) References Cited

U.S. PATENT DOCUMENTS

| | | | | |
|---|---|---|---|---|
| 4,864,433 A | * | 9/1989 | Wakumura | G11B 5/09 |
| 11,108,400 B1 | * | 8/2021 | Armstrong | H03L 7/1976 |
| 2003/0081550 A1 | * | 5/2003 | Mitchell | H04L 12/5601 |
| | | | | 370/232 |
| 2015/0282073 A1 | * | 10/2015 | Davidson | H04W 4/80 |
| | | | | 455/41.2 |
| 2021/0351948 A1 | * | 11/2021 | Lewis | H04L 41/12 |

* cited by examiner

*Primary Examiner* — Lihong Yu
(74) *Attorney, Agent, or Firm* — Lando & Anastasi, LLP

(57) ABSTRACT

A method of monitoring a clock signal of a server is provided. The server includes a phase-locked loop (PLL), a baseboard management controller (BMC), and a light emitting unit. The method includes steps of: A) the server executing a time synchronization service to obtain a synchronization mode that the PLL is operating in, where the synchronization mode is one of a free-run mode, a locked mode, and a holdover mode; B) the server updating the synchronization mode to the BMC when executing the time synchronization service; and C) the BMC storing the synchronization mode and controlling the light emitting unit to display in one of a plurality of displaying manners that corresponds to the synchronization mode.

17 Claims, 2 Drawing Sheets

METHOD OF MONITORING CLOCK SIGNAL OF SERVER

CROSS-REFERENCE TO RELATED APPLICATION

This application claims priority to Taiwanese Invention Patent Application No. 111141599, filed on Nov. 1, 2022.

FIELD

The disclosure relates to a method of monitoring a server, and more particularly to a method of monitoring a clock signal of a server.

BACKGROUND

A conventional server includes a digital phase-locked loop (DPLL) that is a chip disposed on a motherboard. The DPLL is configured to receive a plurality of clock input signals and, according to a preset, select one of the clock input signals as a fundamental clock, and output a clock signal with a frequency that is a multiple of a frequency of the fundamental clock to be used by other chips on the server. The preset indicates which one of the clock input signals to select, a number for frequency multiplication, and an enabling setting of each clock input signal as either enabled to be or disabled from being selected as the fundamental clock. The DPLL that outputs the clock signal may support three synchronization modes, which include a free-run mode, a locked mode, and a holdover mode. However, there is not yet a method for real-time monitoring of which synchronization mode the DPLL is operating in and for conveniently adjusting settings of the DPLL.

SUMMARY

Therefore, an object of the disclosure is to provide a method of monitoring a clock signal of a server that can alleviate at least one of the drawbacks of the prior art.

According to the disclosure, a method of monitoring a clock signal of a server is provided. The server includes a phase-locked loop (PLL), a baseboard management controller (BMC), and a light emitting unit. The method includes steps of: A) the server executing a time synchronization service to obtain a synchronization mode that the PLL is operating in, where the synchronization mode is one of a free-run mode, a locked mode, and a holdover mode; B) the server updating the synchronization mode to the BMC when executing the time synchronization service; and C) the BMC storing the synchronization mode and controlling the light emitting unit to display in one of a plurality of displaying manners that corresponds to the synchronization mode.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
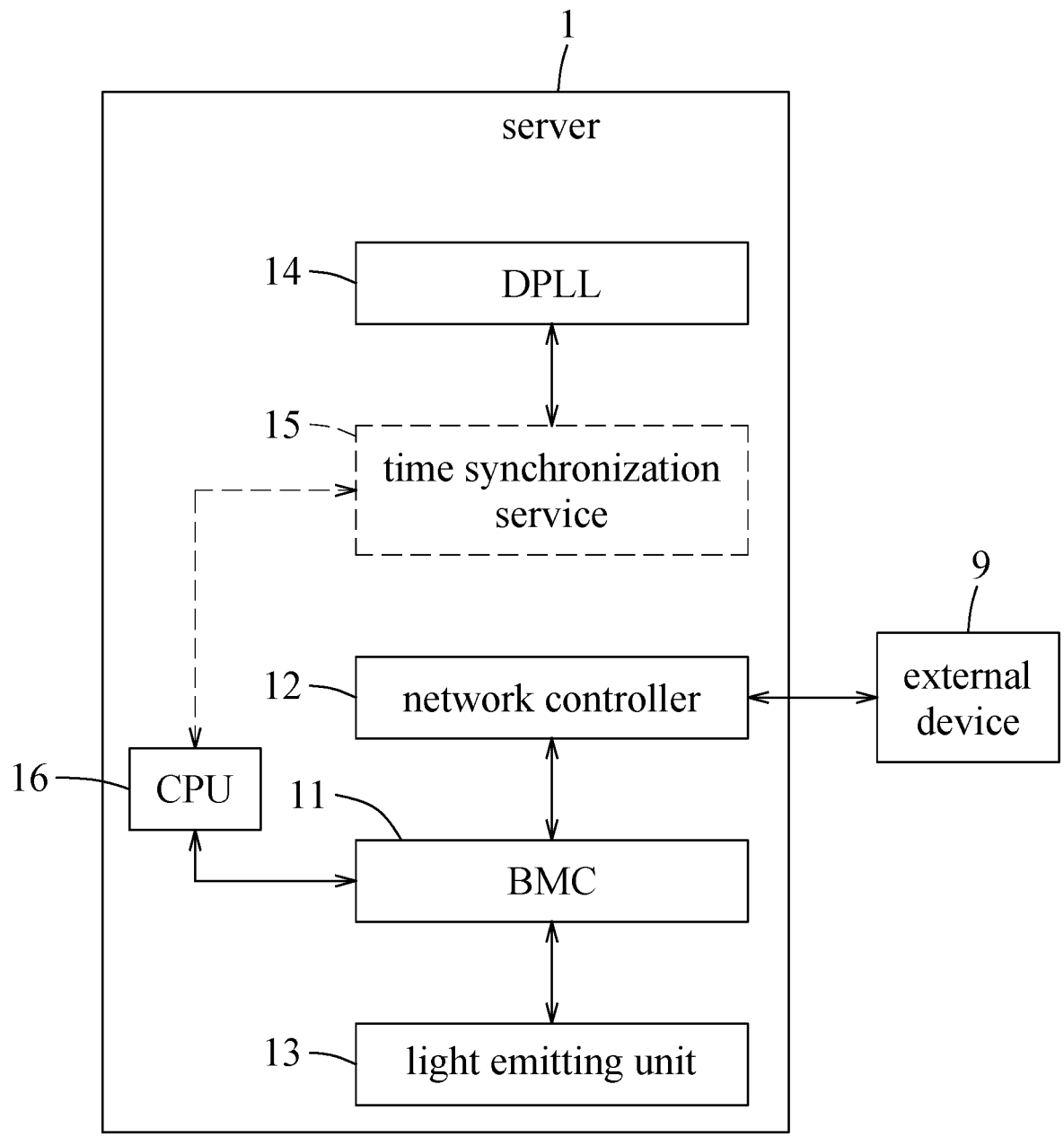
FIG. 1 is a block diagram illustrating a server and an external device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
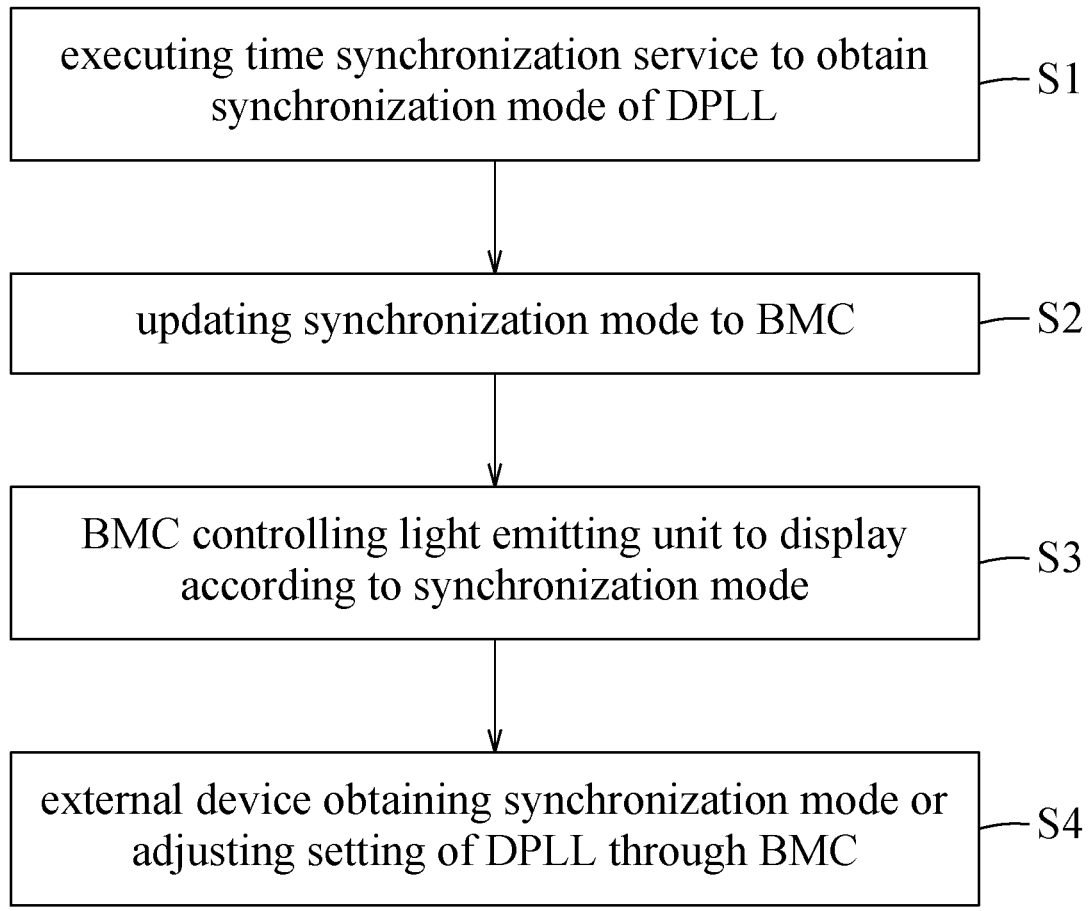
FIG. 2 is a flow chart illustrating a method of monitoring a clock signal of a server according to an embodiment of the disclosure.

Referring to FIGS. 1 and 2, a method of monitoring a clock signal of a server according to an embodiment of the disclosure is provided. The method is to be implemented by a server 1 and an external device 9, and includes steps S1 to S4. The server 1 includes a baseboard management controller (BMC) 11, a network controller 12, a light emitting unit 13, and a digital phase-locked loop (DPLL) 14. The external device 9 may be, but not limited to, a host computer (e.g., a laptop computer, a desktop computer, another server, etc.) that is located remotely. The network controller 12 may be, but not limited to, a network chip, a network card, a network module, or a network related firmware code that is executed by a controller of the server 1 such as the BMC 11, and that supports Ethernet technology for connecting to the host computer (i.e., the external device 9). The light emitting unit 13 may be implemented with a light-emitting diode (LED), a liquid crystal display (LCD), an organic light-emitting diode, etc. The DPLL 14 may be a chip that is configured to receive a plurality of clock input signals, and according to a preset, select one of the clock input signals as a fundamental clock, and output an output clock signal with an output frequency that is a multiple of a fundamental frequency of the fundamental clock to be used by other chips on the server 1. The preset indicates which one of the clock input signals to select, a number for frequency multiplication (referred to as a multiplier number hereinafter, so that the output frequency of the output clock signal is a product of the fundamental frequency of the fundamental clock and the multiplier number), and an enabling setting of each clock input signal as either enabled to be or disabled from being selected as the fundamental clock.

In step S1, the server 1 executes a time synchronization service 15 (which may be a software module) to obtain a synchronization mode that the DPLL 14 is operating in. In this embodiment, a central processing unit (CPU) 16 of the server 1 executes the time synchronization service 15, and obtains the synchronization mode by reading from the DPLL 14 periodically (e.g., every second) via an inter-integrated circuit (I2C) bus interface. In this embodiment, the synchronization mode is one of a free-run mode, a locked mode, and a holdover mode.

In the free-run mode, the output clock signal outputted by the DPLL 14 is not synchronized with any of the clock input signals, and the output clock signal thus outputted does not change according to the clock input signals. In the locked mode, the output clock signal outputted by the DPLL 14 is synchronized with one of the clock input signals (i.e., the fundamental clock), and is automatically and periodically synchronized with the fundamental clock. If the output clock signal outputted by the DPLL 14 was once synchronized with one of the clock input signals (i.e., the fundamental clock) but somehow lost the synchronization with the fundamental clock, the DPLL 14 may enter the holdover mode for a period of time, where the output clock signal outputted by the DPLL 14 is kept unchanged (i.e., same as the last time the output clock signal was synchronized with the fundamental clock). The reason why the synchronization is lost could be, for example, that the DPLL 14 no longer receives the fundamental clock because the fundamental clock was lost, that the clock input signals received by the DPLL 14 are all disabled, or that the DPLL 14 received multiple clock input signals that are enabled and that all have the highest priority level. The DPLL 14 remains in the holdover mode if an elapse time, which is a time period that has elapsed since the last time the output clock signal was synchronized with the fundamental clock, is less than a predetermined period (e.g., an hour or a few minutes). When the elapse time is longer than the predetermined period, the output clock signal outputted by the DPLL 14 is no longer considered as having a reliable correspondence with the fundamental clock, and thus the CPU 16 changes the synchronization mode of the DPLL 14 from the holdover mode to the free-run mode.

In step S2, the server 1 updates the BMC 11 on the synchronization mode via an intelligent platform management interface (IPMI) when the server 1 is executing the time synchronization service 15. In this embodiment, the CPU 16 of the server 1 updates the BMC 11 on the synchronization mode obtained in step S1 via the IPMI. In some embodiments, the server 1 may update the BMC 11 on the synchronization mode via another communication interface that is configured to allow the BMC 11 to monitor or perform two-way communication with the internal components of the server 1. Said another communication interface may be, but not limited to, a low pin count (LPC) interface, a universal asynchronous receiver-transmitter (UART) interface, an inter-integrated circuit (I2C) bus, a system management bus (SMBus), or a serial peripheral interface (SPI).

In step S3, the BMC 11 receives the synchronization mode and stores the synchronization mode thus received in the BMC 11 (i.e., the BMC 11 storing the synchronization mode using an update or overwrite procedure, thus only keeping the synchronization mode that is the most up-to-date), and controls the light emitting unit 13 to display in one of a plurality of displaying manners that corresponds to the synchronization mode, where the different displaying manners respectively correspond to different types of the synchronization mode (e.g., the free-run mode, the locked mode, the holdover mode, etc.). For example, when the synchronization mode is the free-run mode, the BMC 11 controls the light emitting unit 13 to not emit light; when the synchronization mode is the locked mode, the BMC 11 controls the light emitting unit 13 to continuously emit light (e.g., continuously emitting green light); and when the synchronization mode is the holdover mode, the BMC 11 controls the light emitting unit 13 to emit blinking light (e.g., emitting blinking green light). Thus, when a user is close to the server 1, the user may easily identify the synchronization mode that the DPLL 14 is currently operating in by checking which one of the displaying manners the light emitting unit 13 is currently displaying in.

In step S4, the external device 9 is connected to the network controller 12 via a network, and obtains the synchronization mode from the BMC 11 through the network controller 12, where the network controller 12 is configured to communicate with the BMC 11 using, for example, a network controller sideband interface (NC-SI). In one example, the external device 9 may obtain the synchronization mode by sending a query request for querying the synchronization mode of the DPLL 14 to the BMC 11. In this embodiment, when the BMC 11 receives the query request from the external device 9, the BMC 11 provides the synchronization mode that is stored in the BMC 11 to the external device 9. In another embodiment, when the BMC 11 receives the query request from the external device 9, the BMC 11 acquires an update on the synchronization mode from the server 1 through the time synchronization service 15, and provides the synchronization mode thus acquired to the external device 9.

In yet another embodiment, the query request further includes a device code that corresponds to the external device 9, the BMC 11 stores a safe list that contains at least one default device code, and the BMC 11 may receive the output clock signal directly or indirectly from the DPLL 14. When the BMC 11 receives the query request from the external device 9, the BMC 11 first determines whether the device code included in the query request conforms with one of the at least one default device code on the safe list. When the BMC 11 determines that the device code conforms with one of the at least one default device code, the BMC 11 provides the synchronization mode that is stored in the BMC 11 and the output clock signal that is received from the DPLL 14 to the external device 9; otherwise, when the BMC 11 determines that the device code does not conform with any one of the at least one default device code on the safe list, the BMC 11 does not provide the synchronization mode and the output clock signal to the external device 9.

The external device 9 may further send a setting request to the BMC 11 through the network controller 12 using the NC-SI, where the setting request is for adjusting a setting of the DPLL 14, and may include, for example, a number to be used as the multiplier number, the enabling setting and/or a priority level of each clock input signal, a target clock code that indicates one of the clock input signals to be adjusted, other parameters, or any combination thereof. In this embodiment, when the BMC 11 receives the setting request from the external device 9, the BMC 11 sends the setting request to the time synchronization service 15 via the IPMI (i.e., the BMC 11 sends the setting request to the CPU 16 that is executing the time synchronization service 15), and the CPU 16 adjusts the setting of the DPLL 14 based on the setting request while executing the time synchronization service 15. The DPLL 14 then selects one of the clock input signals as the fundamental clock according to the setting of the DPLL 14 that has been adjusted based on the target clock code of the setting request (e.g., by adjusting the enabling setting and/or the priority level of each clock input signal), adjusts the multiplier number to be the number included in the setting request, and outputs the output clock signal based on the fundamental clock thus selected and the multiplier number thus adjusted.

To be more specific, the DPLL 14 records the priority level and the enabling setting of each clock input signal, which may be adjusted according to the setting request, and when the DPLL 14 operates in the locked mode, the DPLL 14 selects one of the clock input signals to be the fundamental clock based on the priority level and the enabling setting of each clock input signal (i.e., selecting one of the clock input signals that has the highest priority level among the enabled clock input signals), periodically synchronizes with the fundamental clock, and uses the fundamental clock to generate and output the output clock signal with the output frequency that is a product of the fundamental frequency of the fundamental clock and the multiplier number included in the setting request. When the DPLL 14 operates in the holdover mode or the free-run mode, the DPLL 14 is still able to generate and output a clock signal, but the DPLL 14 no longer has a fundamental clock to synchronize with (i.e., unable to select one of the clock input signals to be a fundamental clock).

In this embodiment, in step S4, the external device 9 may send the setting request for adjusting the setting of the DPLL 14 directly to the BMC 11 through a network. The setting request may include the target clock code that indicates one of the clock input signals to be adjusted, and a priority level adjustment instruction for adjusting the priority level (e.g., a priority level of "one" means having the highest priority in terms of being selected as the fundamental clock, a priority level of "two" means having a second highest priority in terms of being selected as the fundamental clock, etc.) of the one of the clock input signals as indicated by the target clock code.

In another embodiment, the setting request may include the target clock code that indicates one of the clock input signals to be adjusted, and an enabling adjustment instruction for adjusting the enabling setting (e.g., set to either enabled or disabled) of the one of the clock input signals as indicated by the target clock code.

In practice, the target clock code may indicate all of the clock input signals. As an example, when the CPU 16 of the server 1 receives the setting request that includes the enabling adjustment instruction and the target clock code indicating all of the clock input signals, the CPU 16 adjusts the enabling settings respectively for all of the clock input signals that are received by the DPLL 14 according to the enabling adjustment instruction of the setting request.

After the CPU 16 of the server 1 adjusts the setting of the DPLL 14 according to the setting request, the DPLL 14 reselects one of the clock input signals to be the fundamental clock based on the priority level and the enabling setting of each clock input signal, and generates and outputs the output clock signal based on the fundamental clock thus reselected.

It should be noted that, in some embodiments, the BMC 11 includes a network function, and the network controller 12 may be omitted. In other words, the network controller 12 may be embedded in the BMC 11, or the BMC 11 may include functions of the network controller 12. In this case, in step S4, the external device 9 is connected to the BMC 11 through a network for sending the query request and/or the setting request to the BMC 11, thus obtaining the synchronization mode of the DPLL 14 or adjusting the setting of the DPLL 14. In this embodiment, the DPLL 14 is coupled to or embedded in the CPU 16 of the server 1, and the adjustments on the setting of DPLL 14 is done by the CPU 16. In some embodiments, the time synchronization service 15 is executed by the BMC 11, the DPLL 14 is coupled to or embedded in the BMC 11, and the adjustments on the setting of DPLL 14 is done by the BMC 11.

In summary, by obtaining the synchronization mode that the DPLL 14 is operating in through the time synchronization service 15, and updating the BMC 11 on the synchronization mode thus obtained, the BMC 11 is able to control the light emitting unit 13 to display in one of the displaying manners that corresponds to the synchronization mode. The user may easily identify the synchronization mode that the DPLL 14 is currently operating in based on which one of the displaying manners the light emitting unit 13 is displaying in, and if the synchronization mode is no longer in the locked mode, the user may be able to fix the output clock signal in a timely manner (e.g., before synchronizing a new device to the output clock signal). Furthermore, the external device 9 is able to monitor the synchronization mode that the DPLL 14 is operating in by connecting to the BMC 11, and determine whether to use the output clock signal of the server 1 according to the synchronization mode provided by the BMC 11. The external device 9 may also adjust the output clock signal that is outputted by the DPLL 14 in real-time by connecting to the BMC 11.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of monitoring a clock signal of a server, the server including a phase-locked loop (PLL), a baseboard management controller (BMC), and a light emitting unit, the method comprising steps of:
   A) the server executing a time synchronization service to obtain a synchronization mode the PLL is operating in, where the synchronization mode is one of a free-run mode, a locked mode, and a holdover mode;
   B) the server updating the BMC on the synchronization mode when executing the time synchronization service;
   C) the BMC storing the synchronization mode and controlling the light emitting unit to display in one of a plurality of displaying manners that corresponds to the synchronization mode; and
   E) the BMC receiving a setting request for adjusting a setting of the PLL from an external device through a network;
   wherein the PLL receives a plurality of clock input signals, and records a priority level and an enabling setting for each of the clock input signals, and, when the PLL is operating in the locked mode, the PLL selects one of the clock input signals to be a fundamental clock based on the priority level and the enabling setting of each of the clock input signals, and generates and outputs an output clock signal based on the fundamental clock;
   wherein when the BMC receives the setting request from the external device, the BMC causes the server to adjust the setting of the PLL based on the setting request while the server is executing the time synchronization service;
   wherein the setting request includes a multiplier number for frequency multiplication and a target clock code that indicates one of the clock input signals to be adjusted, and the PLL selects one of the clock input signals to be the fundamental clock according to the setting of the PLL that has been adjusted based on the target clock code of the setting request, and generates and outputs the output clock signal based on the fundamental clock and the multiplier number that is included in the setting request.

2. The method as claimed in claim 1, wherein
in step B), the server updates the BMC on the synchronization mode via a communication interface;
the method further comprising a step of:
D) the BMC providing the synchronization mode to the external device through the network.

3. The method as claimed in claim 2, wherein in step D), when the BMC receives a query request for querying the synchronization mode of the PLL from the external device, the BMC sends the synchronization mode that is stored in the BMC to the external device.

4. The method as claimed in claim 2, wherein in step D), when the BMC receives a query request for querying the synchronization mode of the PLL from the external device, the BMC acquires an update on the synchronization mode from the server through the time synchronization service, and sends the synchronization mode thus updated to the external device.

5. The method as claimed in claim 2, further comprising, prior to step D), steps of:
the BMC receiving a query request for querying the synchronization mode of the PLL from the external device, where the query request includes a device code that corresponds to the external device; and
the BMC determining whether the device code conforms with a default device code that is on a safe list;
wherein step D) is performed only when the BMC determines that the device code conforms with the default device code; and
wherein step D) further includes sending the output clock signal that is received from the PLL to the external device.

6. The method as claimed in claim 1, wherein:
the server further includes a network controller that is configured to communicate with the BMC using a network controller sideband interface (NC-SI); and
in step B), the server updates the BMC on the synchronization mode via a communication interface;
the method further comprising a step of:
D) the BMC providing the synchronization mode to the external device through the network controller that is connected to the external device via the network.

7. The method as claimed in claim 6, wherein in step D), when the BMC receives a query request for querying the synchronization mode of the PLL from the external device, the BMC sends the synchronization mode that is stored in the BMC to the external device.

8. The method as claimed in claim 6, wherein in step D), when the BMC receives a query request for querying the synchronization mode of the PLL from the external device, the BMC acquires an update on the synchronization mode from the server through the time synchronization service, and sends the synchronization mode thus updated to the external device.

9. The method as claimed in claim 6, further comprising, prior to step D), steps of:
the BMC receiving a query request for querying the synchronization mode of the PLL from the external device, where the query request includes a device code that corresponds to the external device; and
the BMC determining whether the device code conforms with a default device code that is on a safe list;
wherein step D) is performed only when the BMC determines that the device code conforms with the default device code; and
wherein step D) further includes sending the output clock signal that is received from the PLL to the external device.

10. The method as claimed in claim 1, wherein the setting request further includes a priority level adjustment instruction that corresponds to said one of the clock input signals as indicated by the target clock code, and the server adjusts the priority level that corresponds to said one of the clock input signals according to the priority level adjustment instruction.

11. The method as claimed in claim 1, wherein the setting request further includes an enabling adjustment instruction that corresponds to said one of the clock input signals as indicated by the target clock code, and the server adjusts the enabling setting that corresponds to said one of the clock input signals according to the enabling adjustment instruction, where the enabling setting indicates whether to enable said one of the clock input signals to be used as the fundamental clock.

12. The method as claimed in claim 1, wherein the server further includes a network controller that is configured to communicate with the BMC using a network controller sideband interface (NC-SI);
wherein in step:
E), the BMC receives the setting request for adjusting the setting of the PLL from the external device through the network controller that is connected to the external device via the network; and
wherein when the BMC receives the setting request from the network controller, which receives the setting request from the external device, the BMC causes the server to adjust the setting of the PLL based on the setting request while the server is executing the time synchronization service.

13. The method as claimed in claim 12, wherein the setting request includes a priority level adjustment instruction that corresponds to said one of the clock input signals as indicated by the target clock code, and the server adjusts the priority level that corresponds to said one of the clock input signals according to the priority level adjustment instruction.

14. The method as claimed in claim 12, wherein the setting request includes an enabling adjustment instruction that corresponds to said one of the clock input signals as indicated by the target clock code, and the server adjusts the enabling setting that corresponds to said one of the clock input signals according to the enabling adjustment instruction, where the enabling setting indicates whether to enable said one of the clock input signals to be used as the fundamental clock.

15. The method as claimed in claim 1, wherein in step C):
the BMC controls the light emitting unit to not emit light when the synchronization mode is the free-run mode;
the BMC controls the light emitting unit to continuously emit light when the synchronization mode is the locked mode; and
the BMC controls the light emitting unit to emit blinking light when the synchronization mode is the holdover mode.

16. The method as claimed in claim 1, wherein the BMC is coupled to the PLL, and the time synchronization service is executed by the BMC for obtaining the synchronization mode of the PLL.

17. The method as claimed in claim 1, wherein the server further includes a central processing unit (CPU) that is coupled to the PLL, and the time synchronization service is executed by the CPU for obtaining the synchronization mode of the PLL.

\* \* \* \* \*